(12) United States Patent
Sendelius et al.

(10) Patent No.: US 12,179,151 B2
(45) Date of Patent: Dec. 31, 2024

(54) WATER PURIFICATION APPARATUS, AND A METHOD FOR CONTROLLING A WATER PURIFICATION APPARATUS

(71) Applicants: BAXTER INTERNATIONAL INC., Deerfield, IL (US); BAXTER HEALTHCARE SA, Glattpark (CH)

(72) Inventors: Peter Sendelius, Staffanstorp (SE); Carl-Henry öä Örndal, Eslöv (SE); Angelica Persson, Lund (SE); Pontus Lundberg, Lund (SE)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 475 days.

(21) Appl. No.: 17/617,839

(22) PCT Filed: Jun. 16, 2020

(86) PCT No.: PCT/EP2020/066533
§ 371 (c)(1),
(2) Date: Dec. 9, 2021

(87) PCT Pub. No.: WO2020/254268
PCT Pub. Date: Dec. 24, 2020

(65) Prior Publication Data
US 2022/0241728 A1  Aug. 4, 2022

(30) Foreign Application Priority Data

Jun. 18, 2019 (SE) .................................. 1950742-5

(51) Int. Cl.
*C02F 1/44* (2023.01)
*B01D 61/08* (2006.01)
*B01D 61/12* (2006.01)

(52) U.S. Cl.
CPC .............. *B01D 61/12* (2013.01); *B01D 61/08* (2013.01); *C02F 1/441* (2013.01);
(Continued)

(58) Field of Classification Search
CPC .... B01D 61/12; B01D 61/08; B01D 2311/10; B01D 2311/14; B01D 2311/243;
(Continued)

(56) References Cited

U.S. PATENT DOCUMENTS 8,518,252 B1 * 8/2013 Li ............................. C02F 9/00
422/26
10,894,725 B1 * 1/2021 Arnold ................. B01D 61/026
(Continued)

FOREIGN PATENT DOCUMENTS

CN        108793329        11/2018
DE        19748997 A1      5/1999
(Continued)

OTHER PUBLICATIONS

Dow Chemical Company, "FILMTEC (TM) Membranes Basics of RO and NF: Principle of Reverse Omosis and Nanofiltration", published Apr. 1, 2008, Retrieved from the Internet: <http://msdssearch.dow.com/PublishedLiteratureDOWCOM/dh003b/0901b8038003b454.pdf?filepath=liquidseps/pdfs/noreg/609-02003.pdf&fromPage=GetDoc>.
(Continued)

*Primary Examiner* — Joseph W Drodge
(74) *Attorney, Agent, or Firm* — K&L Gates LLP

(57) ABSTRACT

A water purification apparatus (1) comprising a Reverse Osmosis, RO, device (26). The RO device (26) comprises a RO membrane (26a) and a feed pump (23). The apparatus (1) also comprises a recirculation mechanism (33) arranged to recirculate a portion of the reject water to the feed water, a temperature sensor device arranged to measure a tempera-
(Continued)

ture indicative of the temperature of the RO membrane (26a), and a flow rate sensor device arranged to measure a flow rate indicative of the permeate flow rate of the permeate water. The apparatus (1) further comprises a control arrangement (50) configured to control recirculation to achieve a predetermined recovery ratio. The control arrangement (50) is also configured to control the rate of the feed pump (23), based on the measured temperature indicative of the temperature of the RO membrane (26a) and a desired permeate conductivity, to make the permeate flow rate equal to, or within a predetermined margin of, an energy efficient permeate flow rate determined based on a predetermined relation between RO membrane temperature, permeate flow rate and permeate conductivity. The disclosure also related to a corresponding method.

16 Claims, 3 Drawing Sheets

(52) U.S. Cl.
CPC ...... *B01D 2311/10* (2013.01); *B01D 2311/14* (2013.01); *B01D 2311/243* (2013.01); *B01D 2311/251* (2022.08); *B01D 2311/2523* (2022.08); *C02F 2209/001* (2013.01); *C02F 2209/005* (2013.01); *C02F 2209/02* (2013.01); *C02F 2209/05* (2013.01); *C02F 2209/40* (2013.01); *C02F 2301/046* (2013.01)

(58) Field of Classification Search
CPC ...... B01D 2311/251; B01D 2311/2523; B01D 2311/16; B01D 61/10; B01D 2311/165; B01D 2311/2512; B01D 2311/252; C02F 1/441; C02F 2209/001; C02F 2209/005; C02F 2209/02; C02F 2209/05; C02F 2209/40; C02F 2301/046; C02F 1/008; C02F 2209/03; C02F 1/44; C02F 2209/003; C02F 2209/006; Y02A 20/131
See application file for complete search history.

(56) References Cited

U.S. PATENT DOCUMENTS

| 2004/0168978 | A1* | 9/2004 | Gray ..................... | B01D 61/22 |
| | | | | 210/636 |
| 2006/0011546 | A1* | 1/2006 | Livingston ........... | B01D 61/025 |
| | | | | 210/652 |
| 2011/0147285 | A1 | 6/2011 | Bonnelye et al. | |
| 2013/0068674 | A1 | 3/2013 | Manabe et al. | |
| 2017/0203979 | A1* | 7/2017 | Tarquin .................. | C02F 1/441 |
| 2018/0318767 | A1* | 11/2018 | Roitel .................... | B01D 61/58 |

FOREIGN PATENT DOCUMENTS

| WO | 2004054691 | | 1/2004 | | |
| WO | 2004054691 | A1 | 7/2004 | | |
| WO | 2017217008 | A1 | 12/2017 | | |
| WO | WO-2018202321 | A1 * | 11/2018 | ......... | A61M 1/1605 |
| WO | WO-2018229125 | A1 * | 12/2018 | ............ | A61M 1/155 |

OTHER PUBLICATIONS

Dupont, "FILMTEC (TM) Membranes: Factors Affecting RO Membrane Performance", published Jun. 1, 2019, Retrieved from the Internet: <https://www.dupont.com/content/dam/dupont/amer/us/en/water-solutions/public/documents/en/45-D00950-en.pdf>.
Hawlader et al., "Desalination of Seawater: An Experiment with RO Membranes", Desalination (2000), vol. 132, pp. 275-280.
Jafar et al., "Real-Time Implementation of a Fuzzy Logic Controller for a Seawater RO Plant", World Automation Congress, IEEE 5th Proceedings (2002), vol. 13, pp. 31-36.
Lee et al., "Jointly Optimized Control for Reverse Osmosis Desalination Process with Different Types of Energy Resource", Energy (2016), vol. 117, pp. 116-130.
Zilouchian et al., "Automation and Process Control of Reverse Osmosis Plants Using Soft Computing Methodologies", Desalination (2001), vol. 135, pp. 51-59.
International Search Report from corresponding International Patent Application No. PCT/EP2020/066533, mailed Aug. 21, 2020.
Written Opinion of the International Searching Authority from corresponding International Patent Application No. PCT/EP2020/066533, mailed Aug. 21, 2020.

* cited by examiner

WATER PURIFICATION APPARATUS, AND A METHOD FOR CONTROLLING A WATER PURIFICATION APPARATUS

PRIORITY CLAIM

The present application is a National Phase of International Application No. PCT/EP2020/066533, filed Jun. 16, 2020, which claims priority to SE Application No. 1950742-5, filed Jun. 18, 2019. The entire contents of each application are incorporated herein by reference and relied upon.

TECHNICAL FIELD

The present disclosure relates to the field of water purification, and in particular to water purification by means of reverse osmosis. In detail, the present disclosure relates to a water purification apparatus and a method for controlling a water purification apparatus.

BACKGROUND

Reverse osmosis (RO) is a technique for water purification, and is used in applications ranging from salt water desalination plants to medical devices.

In a system using RO, the feed water is typically pressurized by a pump and forced through a RO-membrane to overcome the osmotic pressure. The RO-membrane is a semipermeable membrane that let water pass through the membrane creating a purified product stream. The product water is for example used by a medical device as an ingredient in a dialysis solution prepared on-line.

In medical applications, it is important that the quality of the purified water continuously meets specified requirements. A common way to determine the quality of the purified water is to measure the conductivity of the produced water. Conductivity is a measure of the ability of the water to pass electric flow. This ability is directly related to the concentration of ions in the water. These conductive ions come from dissolved salts and inorganic materials such as alkalis, chlorides, sulfides and carbonate compounds. The greater the number of ions, the higher the conductivity. The conductivity measurement thus serves as a measure of water quality.

With age and extensive use, the membrane becomes clogged because of scaling and fouling, and deteriorates because of membrane oxidation. It is also known that the permeability of the membrane changes with the temperature of the water. For example, document WO20172170081A1 discloses that there is a connection between water temperature and the permeability of the membrane. The amount of permeate water is controlled to keep the flow rate of the permeate water constant at all times regardless of the temperature of the raw water or the state of the membrane. However, as the temperature increases, the permeability of the membrane increases, and more impurities are allowed through the membrane. It is thus a challenge to control the purification process to get a stable output, thus a stable permeate conductivity.

SUMMARY

It is an objective of this disclosure to alleviate at least some of the drawbacks with the prior art. It is a further objective to provide a consistent quality of the permeate water from a RO device irrespective of the water temperature. It is another objective to efficiently provide a consistent quality of the permeate water from the RO device.

These objectives and others are at least partly achieved by the method and apparatus according to the independent claims, and by the embodiments according to the dependent claims.

According to a first aspect, the disclosure relates to a method for controlling a water purification apparatus. The water purification apparatus comprises a Reverse Osmosis, RO, device comprising a RO membrane and a feed pump receiving inlet water and passing feed water to an inlet of the RO device, whereby the RO device is creating permeate water and reject water. The method comprises: recirculating, by means of a recirculation mechanism, a portion of the reject water to the feed water to achieve a predetermined recovery ratio of permeate flow rate to feed flow rate, estimating or measuring a temperature indicative of the RO membrane temperature and estimating or measuring a flow rate indicative of a permeate flow rate of the permeate water. The method further comprises controlling the rate of the feed pump, based on the estimated or measured temperature indicative of the RO membrane temperature and a desired permeate conductivity, to make the permeate flow rate equal to, or within a predetermined margin of, an energy efficient permeate flow rate determined based on a predetermined relation between RO membrane temperature, permeate flow rate and permeate conductivity.

The method provides a consistent product water quality irrespective of the water temperature. The method keeps energy consumption down, as the power used by the feed pump is adapted to the temperature of the membrane, and is not driven with more power than necessary. The method maintains the apparatus at a working-point where it produces a product water with a desired, i.e. predetermined or target, conductivity. Thus, the method controls the water purification apparatus to produce water in an efficient way.

In some embodiments, the energy efficient permeate flow rate is equal to a minimum permeate flow rate needed to achieve the desired permeate conductivity. Then, the controlling the rate of the feed pump comprises controlling the rate of the feed pump to achieve an energy efficient permeate flow rate being a minimum permeate flow rate needed to achieve the desired permeate conductivity. Thus, the method maintains the apparatus at a working-point where it produces a permeate water with a desired conductivity, while keeping energy consumption down to a minimum.

In some embodiments, the controlling the rate of the feed pump comprises controlling the rate of the feed pump to increase the flow rate of the permeate water upon the temperature of the RO membrane increases, and controlling the rate of the feed pump to decrease the flow rate of the permeate water upon the temperature of the RO membrane decreases. Thereby the quality of the permeate water can be maintained irrespective of the temperature.

In some embodiments, the method comprises passing a portion of the reject water to a drain. The reject water contains impurities that have been stopped by the membrane, and some of the reject water can be passed to drain to reduce the concentration of impurities in the recirculated water. Thereby also scaling is reduced. In some embodiments, the method comprises measuring conductivity of the permeate water, and controlling a drain valve to pass a portion of the reject water to a drain to make the conductivity of the permeate water equal to, or within a predetermined margin of, the desired permeate conductivity. By reducing the concentration of impurities and thus the conductivity of the recirculated water, the method supports the apparatus to stay on the desired working-point using less power. If the feed pump is using less power, it often also develops less heat that may heat up the water and the RO membrane surface. As heat increases calcium carbonate precipitation and forms scale on the RO membrane surface, it is desired to keep RO membrane temperature down, to decrease scaling.

In some embodiments, the method comprising measuring a permeate flow rate downstream a recirculation point, and controlling recirculation of permeate water from the recirculation point to the inlet water at a point upstream the feed pump, to obtain a predetermined permeate flow rate downstream the recirculation point. Thereby a predetermined permeate flow rate may be achieved to meet a consumer need, and the sometimes excessive amount of produced permeate water can be re-used. Thus, the permeate flow rate can be increased, to obtain a higher permeate pressure and thereby a lower permeate conductivity.

In some embodiments, the method comprises measuring conductivity of the feed water. Then, the controlling of the feed pump rate comprises controlling the feed pump rate, based also on the measured conductivity of the feed water, to make the permeate flow rate equal to, or within a predetermined margin of the energy efficient permeate flow rate, wherein the energy efficient permeate flow rate is determined based on a predetermined relation between RO membrane temperature, permeate flow rate, permeate conductivity and the feed water conductivity. Thereby the control can be adapted to a varying conductivity of the inflow water to the feed pump.

In some embodiments, the controlling the feed pump comprises controlling the feed pump by means of a feedback-controller, where the input to the feedback-controller is the permeate flow rate, and the control variable is the feed pump rate. Thereby self-regulating control is achieved.

In some embodiments, the controlling the drain valve comprises using a feedback-controller, where the input to the feedback-controller is the conductivity of the permeate water, and the control variable is the opening of the drain valve. Thereby self-regulating control is achieved.

In some embodiments, the recirculating comprises calculating a recovery ratio as $$Y = \frac{Q_p}{Q_f}.$$

Thus, the recovery ratio can be continually or continuously determined, and the recovery ratio continually or continuously controlled.

According to a second aspect, the disclosure relates to a water purification apparatus. The water purification apparatus comprises a Reverse Osmosis, RO, device comprising a RO membrane, and a feed pump arranged to receive inlet water and to pass feed water to an inlet of the RO device, whereby the RO device is arranged to create permeate water and reject water. The apparatus further comprises a recirculation mechanism arranged to recirculate a portion of the reject water to the feed water, a temperature sensor device arranged to measure a temperature indicative of the temperature of the RO membrane and a flow rate sensor device arranged to measure a flow rate indicative of the permeate flow rate of the permeate water. The apparatus also comprises a control arrangement configured to control recirculation of a portion of reject water by means of the recirculation mechanism to achieve a predetermined recovery ratio of permeate flow rate to feed flow rate. The control arrangement is further configured to control the rate of the feed pump, based on the measured temperature indicative of the temperature of the RO membrane and a desired permeate conductivity, to make the permeate flow rate equal to, or within a predetermined margin of, an energy efficient permeate flow rate, determined based on a predetermined relation between RO membrane temperature, permeate flow rate and permeate conductivity.

The apparatus provides a consistent product water quality irrespective of the water temperature. The apparatus keeps energy consumption down, as the power used by the feed pump is adapted to the temperature of the membrane, and is not driven with more power than necessary. The apparatus is maintained at a working-point where it produces a product water with a desired conductivity.

According to some embodiments, the apparatus comprises a permeate recirculation line arranged between a recirculation point in a permeate water line and an inlet water line, a control device arranged to control a flow rate of the recirculated permeate water in the permeate recirculation line, and a second flow rate sensor device, arranged to measure a permeate flow rate downstream the recirculation point. The control arrangement is configured to control recirculation of permeate water in the permeate recirculation line, by means of the control device, to obtain a predetermined permeate flow rate downstream the recirculation point. Thereby a predetermined permeate flow rate may be achieved to meet a consumer need, and the sometimes excessive amount of produced permeate water can be re-used.

According to some embodiments, the recirculation mechanism is a recirculation pump. Thereby a desired, i.e. predetermined, net driving pressure, NDP, can be maintained over the membrane in an easy way, and the energy consumption can be reduced compared to having only a feed pump.

According to a third aspect, the disclosure relates to a computer program comprising instructions to cause the apparatus according to the first aspect to execute the steps of the method according to the second aspect.

According to a fourth aspect, the disclosure relates to a computer-readable medium having stored thereon the computer program of the third aspect.

DETAILED DESCRIPTION

In the following a water purification apparatus and methods for controlling the apparatus, will be described. The water purification apparatus relies on reverse osmosis, RO, and an aim of the disclosure is to control the apparatus such that the apparatus consistently produces permeate water with a desired, predetermined quality.

The permeability of a RO membrane varies with a varying temperature of the feed water (that will also vary the temperature of the membrane). Hot water has lower viscosity than cold water and also has a higher diffusion rate than cold water. The pores of the membrane are expanding at higher temperatures, causing a higher flow through the membrane from feed to product side. Consequently, higher temperatures cause higher permeate flow over the membrane and increased salt passage through the membrane. If both water and salt passage were equally affected by temperature the rejection rate would not change with varying temperature. However, high temperatures make it easier for salts to pass through the membrane than water, resulting in a larger flow of water that contains a proportionally larger amount of dissolved salts. In order to improve the salt rejection rate, more permeate water needs to pass through the membrane to dilute the salts and this can be achieved by increasing feed side pressure, causing a higher flow.

Based on these insights, the inventors have realized that the permeate conductivity varies as a function of RO membrane temperature, feed conductivity and permeate flow rate. The net driving pressure (pressure difference from feed side to permeate side of the membrane, minus the osmotic pressure) has a direct effect on the permeate flow rate. Thus, the net driving pressure is proportional to the permeate flow rate. The net driving pressure is proportional to the number of revolutions per minute (RPM) of the feed pump, and thus, the permeate flow rate may be directly controlled by means of the feed pump. Thus, for every membrane temperature and feed conductivity, a feed pump rate may be determined that achieves a desired permeate conductivity, optionally with a minimum amount of energy spent.

The understanding above provides basis for efficient control of the water purification apparatus. In the following a conceptual water purification system and some embodiments of water purification apparatuses will be described.

Figure 1:
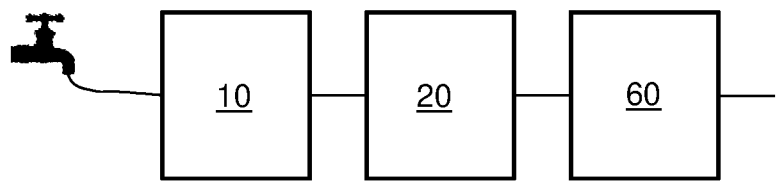
FIG. 1 illustrates a conceptual water purification system according to some embodiments.

FIG. 1 conceptually illustrates a plurality of modules of a water purification system according to an example embodiment. The plurality of modules comprises a first module 10, a second module 20 and a third module 60. The first module 10 includes a pre-purification step, where water from e.g. a tap is pre-treated. For example, the first module 10 comprises one or several carbon beds for removing chlorine. The first module 10 produces purified inlet water, which is passed to the second module 20. The second module 20 uses reverse osmosis to purify water. The incoming purified inlet water is pressurized using a feed pump, and pushed through a RO membrane to produce permeate water. The permeate water is passed to the third module 60, where the permeate water is further treated using a deionizer, for example using electrodeionization (EDI), capacitive deionization (CDI), electrodialysis reversal (EDR), or an ion exchange resin bed. The purified water from the deionizer is referred to as product water. The product water is passed to a consumer point for collection or use by another application.

Figure 2:
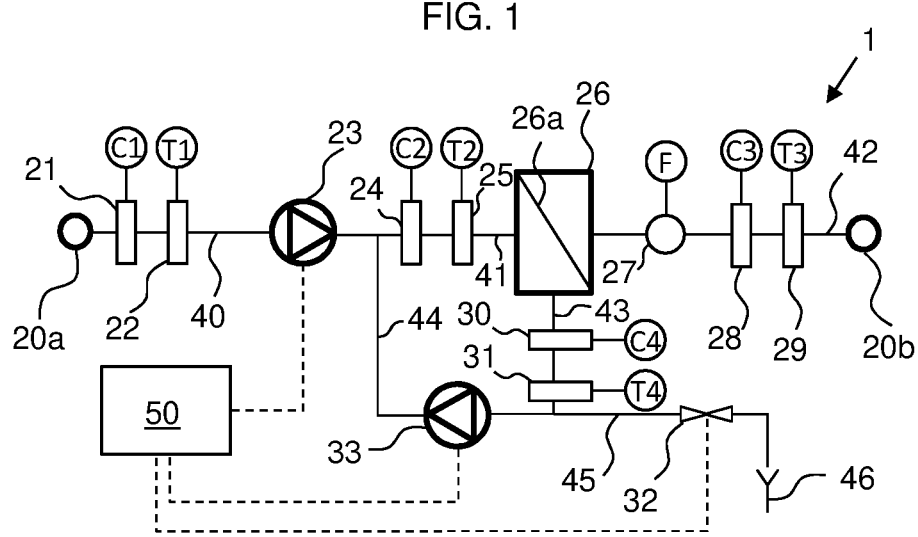
FIG. 2 illustrates a water purification apparatus according to a first embodiment.

FIG. 2 illustrates a water purification apparatus 1 according to a first embodiment of the disclosure. The water purification apparatus 1, hereinafter referred to as "the apparatus 1", may include module 20 of the water purification system illustrated in FIG. 1. Alternatively, the apparatus 1 receives water from the tap directly. In some embodiments, the apparatus 1 also includes module 10 and/or module 60.

The apparatus 1 comprises a RO device 26 comprising a RO membrane 26a, and a feed pump 23. The apparatus 1 receives inlet water, pre-treated or directly from a source, at a connection point 20a at one end of an inlet line 40. The inlet line 40 is at the other end connected to an inlet of the feed pump 23. A feed line 41 is arranged between the feed pump 23 and the RO device 26, and is connected at one end to an outlet of the feed pump 23 and at the other end to an inlet of the RO device 26. The feed pump 23 is arranged to receive inlet water via the inlet line 40 from the connection point 20a, and to pump feed water via the feed line 41 to the inlet of the RO device 26. The feed pump 23 is for example a magnet drive rotary vane pump. The RO device 26 is arranged to create permeate water and reject water from the received pressurized feed water. A permeate line 42 is connected between the RO device 26 and a connection point 20b. The permeate line 42 is connected at one end to a permeate outlet of the RO device 26, and the other end defines the connection point 20b. The permeate water is passed through the permeate line 42 to the connection point 20b. A reject line 43 connects the RO device 26 with a recirculation line 44 and a waste line 45. The reject line 43 is connected at one end to a reject outlet of the RO device 26, and at the other end to the recirculation line 44 and the waste line 45. The recirculation line 44 is connected between the reject line 43 and the feed line 41. Thus, the recirculation line 44 is at one end connected to the reject line 43 and at the other end connected to the feed line 41. The waste line 45 is connected between the reject line 43 and an outlet connected to a drain 46. Thus, the waste line 45 is at one end connected to the reject line 43, and at the other end connected to the outlet. The outlet may in return be connected to a drain 46 with a hose or similar.

A recirculation mechanism 33 is arranged to recirculate a portion of the reject water to the feed water. The recirculation mechanism 33 is arranged to the recirculation line 44. The recirculation mechanism 33 is for example a recirculation pump. In one embodiment, the recirculation pump is a magnet drive rotary vane pump. By having a recirculation pump (in addition to the feed pump), the net driving pressure, NDP, across the membrane 26a and the reject flow rate may be independently controlled. The feed pump 23 maintains a pressure over the membrane 26a, and the recirculation pump 33 creates the necessary flow rate in the recirculation line 44 to maintain the recovery ratio. Then, the feed pump 23 does not need to be controlled to maintain the recovery as in previous systems, instead, the feed pump 23 can be controlled to a certain RPM that is known to produce a certain permeate flow rate. Then, a foreseen pressure drop over the membrane 26a when the temperature increases will be reduced. The reduced pressure drop causes the membrane 26a to be more evenly pressurized, creating a more uniform permeate flux across the membrane. This may prevent an uneven scaling of the membrane 26a. Also, when using such a two-pump system, the energy needed to run the pumps can be lowered compared to having only a feed pump 23 (no recirculation pump). This because the feed pump 23 more easily achieves a high net driving pressure, as the recirculation pump controls the recirculation flow rate. Further, by using two pumps instead of one, the noise level is reduced as if using only one pump, the one pump needs to be driven at a higher RPM, and thus produce more noise.

Alternatively, the recirculation mechanism 33 is a control valve, e.g. a flow control valve or a pressure control valve. A flow control valve is for example a flow limiting valve such as a restrictor, that only let a predetermined flow rate pass. A pressure control valve reduces the input pressure of the water to a desired predetermined pressure at its output.

Then, the feed pump is used to create a feed flow rate, and together with the control valve a pressure over the membrane 26a.

In the one pump system (with a feed pump but no recirculation pump), the feed pump 23 creates both flow and pressure and these parameters are therefore coupled to each other and cannot be changed independently. The net driving pressure is generated by the resistance in the membrane 26a and also in the control valve. As a result, the feed pump 23 must deliver a large amount of water to build the pressure needed to push the water through the membrane 26a. By replacing the control valve with a recirculation pump, the feed pump 23 can pressurize the recirculation line 44 without a high water flow. As a result, the feed pump 23 can run at a much lower rpm. The recirculation pump creates the recirculation flow rate but does not have to generate any pressure since the recirculation line 44 is pressurized by the feed pump 23.

A drain valve 32 is arranged to pass a portion of the reject water to the drain 46. The drain valve 32 is arranged to the waste line 45. In some embodiments, the drain valve 32 is manually configurable. The drain valve 32 is in some embodiments a motorized valve, thus, it can be automatically controlled and configured.

The apparatus 1 comprises a plurality of sensor devices, e.g. to monitor the function of the apparatus 1. The apparatus 1 here comprises a conductivity cell 28, arranged to measure conductivity C3 of the permeate water. The conductivity cell is arranged to the permeate line 42. The conductivity measurement typically should be calibrated based on the temperature, and in some embodiments the apparatus 1 comprises a permeate temperature sensor device arranged to measure the temperature T3 of the permeate water. The temperature sensor device 29 is arranged to the permeate line 42. In some embodiments, the temperature sensor device 29 is arranged to measure the temperature of the permeate water close to, e.g. in the neighborhood of, the permeate outlet of the RO-device 26. In some embodiments, the apparatus 1 comprises a first flow rate sensor device 27, arranged to measure the flow rate of the permeate water in the permeate line 42. Thus, the apparatus 1 comprises a first flow rate sensor device 27 arranged to measure a flow rate indicative of the permeate flow rate of the permeate water.

In some embodiments, the apparatus 1 comprises an inlet conductivity cell 21, arranged to measure the conductivity C1 of the inlet water in the inlet line 40, and optionally an inlet temperature sensor device 22 arranged to measure the temperature T1 of the inlet water in the inlet line. In some embodiments, the apparatus 1 comprises a feed conductivity cell 24, arranged to measure the conductivity C2 of the feed water in the feed line 41, and optionally a feed temperature sensor device 25 arranged to measure the temperature T2 of the feed water in the feed line 41. In some embodiments, the apparatus 1 comprises a reject conductivity cell 30, arranged to measure the conductivity C4 of the reject water in the reject line 30, and optionally a reject temperature sensor device 31 arranged to measure the temperature T4 of the reject water in the reject line 43. The apparatus 1 further comprises a temperature sensor device arranged to measure a temperature indicative of the temperature of the RO membrane 26a. This temperature sensor device may be any of the described temperature sensor devices herein, such as the inlet temperature sensor device 21, the feed temperature sensor device 25, the reject temperature sensor device 31, or any other temperature sensor device as described herein.

The apparatus 1 also comprises a control arrangement 50. The control arrangement 50 typically comprises control circuitry such as processor and memory. The processor includes, for example, one or several central processing units (CPUs). The memory includes, for example, one or several memory units. In some embodiments, the memory stores a computer program comprising instructions to cause the apparatus 1 to execute a method for controlling the water purification apparatus 1. Thus, the computer program is stored on a computer-readable medium. The computer-readable medium may also be stored on an external memory such as a flash memory, a cloud-based memory or a memory on another computer. The control arrangement 50 also comprises a communication interface, that may be wired or wireless, in order to be able to communicate with components of the apparatus 1 such as sensor devices, pumps, recirculation mechanisms, valves, a user interface etc. A component such as a sensor device should be understood to include a sensor configured to sense or measure a desired property.

The control arrangement 50 is for example configured to receive information such as measured sensor device values or data from the described components such as conductivity cells, temperature sensor devices, flow rate sensor devices, pumps, recirculation mechanism, valves etc. The control arrangement 50 is also configured to send control signals or control data to the described components such as the feed pump, the recirculation mechanism, the waste valve etc.

Figure 3:
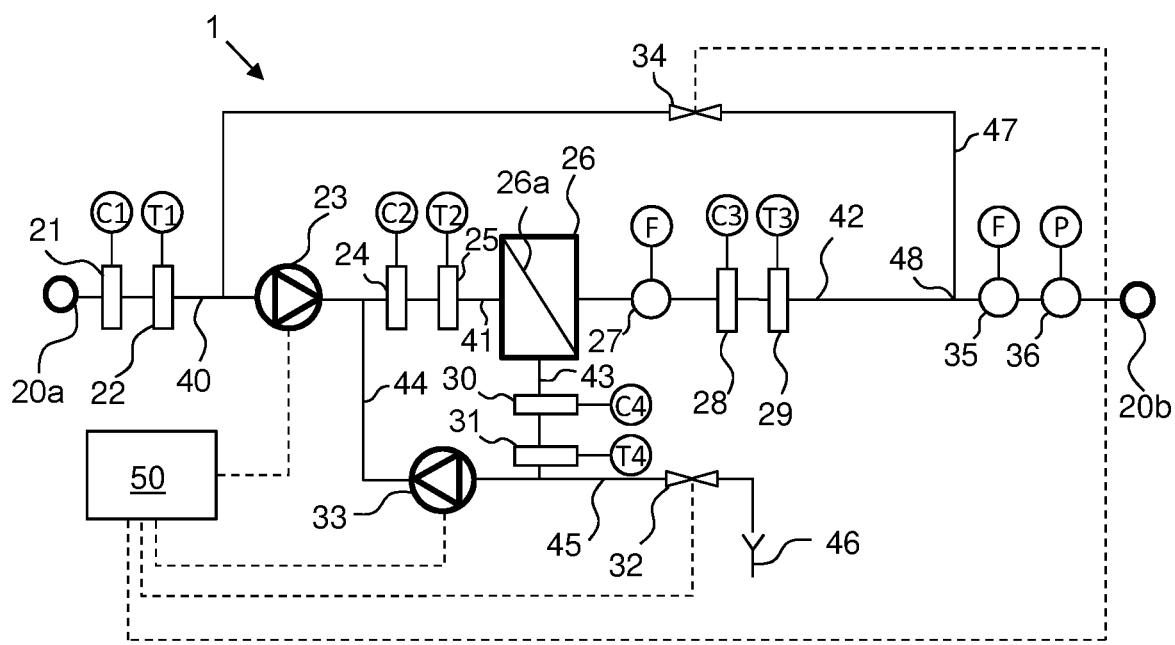
FIG. 3 illustrates a water purification apparatus according to a second embodiment.
Figure 4:
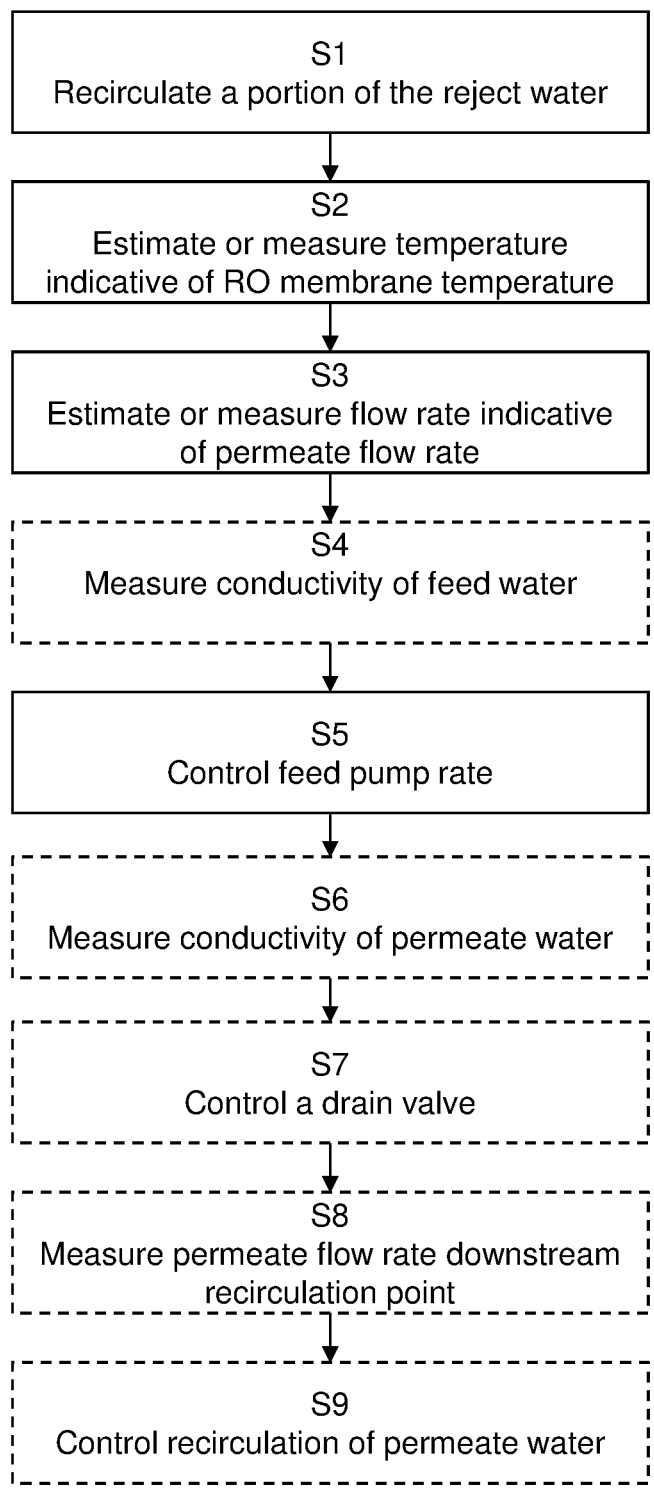
FIG. 4 illustrates a flow chart of a method for controlling a water purification apparatus according to the second aspect.

FIG. 3 illustrates a water purification apparatus according to a second embodiment. In addition to the components already described with reference to the water purification apparatus in FIG. 2, the water purification apparatus 1 in FIG. 3 comprises a permeate recirculation line 47 arranged between a recirculation point 48 in the permeate water line 42 and the inlet water line 40. The permeate recirculation line 47 thus connects the permeate water line 42 and the inlet water line 40. The recirculation point 48 is located downstream the first flow rate sensor device 27, and upstream a second flow rate sensor device 35 and a permeate pressure sensor device 36. The permeate recirculation line 47 connects to the inlet water line 40 upstream the feed pump 23, and downstream the inlet conductivity cell 21 and inlet temperature sensor device 22, if present. A control device 34 is arranged to control a flow rate of the recirculated permeate water in the permeate recirculation line 47. In some embodiments, the control device 34 is a valve, e.g. a motorized valve. The second flow rate sensor device 35 is arranged to measure a permeate flow rate downstream the recirculation point 48. In some embodiments, the apparatus 1 comprises a permeate pressure sensor device 36 arranged to measure the pressure in the permeate line 42 downstream the recirculation point 48.

In addition to what previously described, the control arrangement 50 in the second embodiment of the apparatus 1 is configured to receive measured sensor device values from the additional components such as conductivity cells, temperature sensor devices, flow rate sensor devices, pressure sensor devices, valves, etc. The control arrangement 50 is also configured to send control signals or control data to the additionally described components such as the permeate recirculation valve 34 etc.

In the following a method for controlling a water purification apparatus will be described, for example the water purification apparatus 1 according to any one of the embodiments described in relation to FIG. 2 or FIG. 3. A purpose of the method is to control the water purification apparatus to produce water in an efficient way. The method is typically loaded as a computer program into a memory of a control arrangement of the apparatus 1, and when executed by a processor of a control arrangement of the apparatus 1, makes the apparatus 1 execute the instructions of the computer program. In some embodiments, the method enables control of the flow rate and net driving pressure (NDP, pressure difference from feed side to permeate side of the membrane minus the osmotic pressure) over the RO-membrane 26a to maximize the performance of the membrane 26a, while minimizing waste water and energy consumption.

Before the method is started, the apparatus 1 is connected to a water source at the point 20a. The water source is e.g. a water tap or a pre-treatment module 10 (FIG. 1). Before water purification is started, the water may be tested to make sure it has a conductivity that does not go above an upper conductivity threshold that the apparatus is designed to handle. The water is turned on, and water is flowing into the inlet line 40 at the point 20a. The water is pumped by the feed pump 23 towards the RO device 26, where the feed water is split into permeate water and reject water. The method comprises recirculating S1, by means of the recirculation mechanism 33, a portion of the reject water to the feed water. The recirculation is performed to continually achieve a predetermined recovery ratio of permeate flow rate to feed flow rate. The recovery ratio is determined as how much of the feed water becomes permeate, thus, how much of the feed water that permeate across the RO membrane 26a into the permeate stream. The maximum recovery ratio for the RO-membrane 26a is generally a design parameter that is set by the manufacturer of the RO device. If the recovery is pushed beyond its design value, the reject water will become saturated with salts and scale will begin to form on the membrane surface. In order to avoid such situation, recovery is for example set to a, by the manufacturer, maximum recovery, e.g. between 15-25%, equal to a maximum recovery rate of 0.15-0.25. As known, the recovery is calculated from the recovery ratio multiplicated with 100%. The recovery ratio is typically continuously monitored and controlled. The predetermined recovery ratio is for example set to the maximum recovery. Alternatively, the predetermined recovery ratio is allowed to vary within an interval, where the maximum recovery rate defines the upper limit of the interval. The recovery ratio Y of the membrane 26a may be calculated as $$Y = \frac{Q_p}{Q_f},$$

where $Q_p$ is the permeate flow rate and $Q_f$ is the feed flow rate. In some embodiments, the recirculating S1 comprises measuring a permeate flow rate $Q_p$ of the permeate water. The permeate flow rate is for example measured with the first flow rate sensor device 27. The recirculating S1 may also comprise providing an estimate of a feed flow rate $Q_f$ of the feed water. The feed flow rate $Q_f$ may be estimated from $Q_f = Q_p + Q_{drain}$, where $Q_{drain}$ is the flow rate of the reject water passed to drain, also referred to as drain water. $Q_{drain}$ may be estimated from the amount of time and/or degree the drain valve is open, as known to the skilled in the art. The recirculating S1 then comprises calculating the recovery ratio Y as $$Y = \frac{Q_p}{Q_f},$$

and controlling the recirculation to obtain the predetermined recovery ratio. The recirculating S1 for example comprises using a feed-back controller, where the error between the calculated recovery ratio and the desired, e.g. maximum, recovery ratio is minimized. The feed flow rate is a rate of the feed water in the feed line 41, downstream the connection point of the recirculation line 44. It has been found that the flow rate from respective pump may be estimated from the rate of the same pump, thus, the flow rate is proportional to the rate (e.g. RPM) of the pump, as the pump displacement is known. The flow rate from a pump may thus be determined from a mapping between the flow rate from the pump and the RPM of the same pump. Thus, the flow rate from the feed pump 23 may be estimated from the rate of the feed pump 23. The recirculation flow rate may be estimated from the rate of the recirculation mechanism 33, e.g. a recirculation pump. The feed flow rate, thus the flow rate into the RO-device, may be estimated from the sum of the estimated recirculation flow rate and the estimated flow rate from the feed pump. Alternatively, the feed flow rate is measured with a feed flow rate sensor device (not shown) arranged to measure the feed flow rate downstream the connection point of the recirculation line 44.

The temperature of the inlet water may vary during the year. For example, during summertime the temperature of the inlet water may increase, while during wintertime the temperature of the inlet water may decrease. The temperature of the inlet water affects the temperature of the membrane 26a. The temperature of the membrane 26a may also be affected by the temperature of the environment of the apparatus 1. As the air temperature changes, the whole apparatus 1 may change temperature. This may also affect the temperature of the membrane 26a. As mentioned, the performance of the membrane changes with temperature. The temperature of the membrane 26a should thus be considered when controlling the apparatus 1. Hence, the method further comprises estimating or measuring S2 a temperature indicative of the RO membrane 26a temperature, thus the temperature of the RO membrane 26a. This estimating or monitoring may include monitoring S2 a temperature indicative of the RO membrane 26a temperature. The temperature of any of, a combination of, or a mean value of several of: the inlet water, the feed water, the reject water and the permeate water, may be an estimate of the temperature of the membrane 26a. Alternatively, a model of a temperature dependency of the membrane to any or several of the mentioned temperatures may be used. In another alternative, a temperature sensor device (not shown) is arranged to measure the temperature of the membrane 26a, or the temperature of the water in the RO device 26, directly.

The membrane pore size will increase with increasing temperature, resulting in an increased permeate flow and a decreased pressure over the membrane 26a. As the pore size is increased, more contaminants are also let through the membrane 26a. The salt rejection of the membrane 26a is then decreased. The salt rejection ratio is determined as $$R = 1 - \frac{C_p}{C_f},$$

where $C_p$ is the permeate conductivity and $C_f$ is the feed conductivity (thus conductivity of the feed water in the feed line 41 downstream the recirculation point of the recirculation line 44). To get the percent salt rejection, multiply with 100. By tests it has been concluded that by increasing feed side pressure (thus the pressure in the recirculation line 44), the salt rejection rate is increased. This because more permeate water is passed through the membrane and dilutes the salts. As more permeate water is passed through the membrane 26a, the permeate flow rate is increased. Tests have shown that increased feed water conductivity also decreased the performance of the system, but not as much as increased temperature and the negative effect of high conductivity was more prominent at higher temperatures. Increased feed side pressure has a larger positive effect on salt rejection at high temperature than at lower temperatures. Since test showed that increased temperature decreased net driving pressure (NDP) and that decreased feed pressure reduced salt rejection it could be concluded that using a fixed set-point value at either feed side pressure or permeate flow would not work. Instead a set-point could be determined for a given temperature, and feed side pressure or permeate flow rate could be used as a set-point. By using permeate flow rate instead of feed side pressure as a working-point, factors such as membrane fouling, scaling and individual differences in the membrane could be compensated for while controlling. Therefore, permeate flow rate was selected to be the set-point for the feed pump control.

Assuming that the conductivity of the inlet water is rather constant, an energy efficient permeate flow rate may be determined for each and every temperature of the membrane. The energy efficient permeate flow rate is determined such that the desired permeate conductivity is achieved. The method further comprises estimating or measuring S3 a flow rate indicative of the permeate flow rate $Q_p$ of the permeate water. The permeate flow rate reflects the flow rate of the permeate water directly downstream the RO device 26. This estimating or measuring S3 may include monitoring S3 the permeate flow rate $Q_p$. In some embodiments that will be described in the following, the method also comprises measuring S4 conductivity of the feed water. The method further comprises controlling S5 the rate of the feed pump 23, based on the estimated or measured temperature indicative of the RO membrane temperature and a desired permeate conductivity, to make the permeate flow rate equal to, or within a predetermined margin of, an energy efficient permeate flow rate determined based on a predetermined relation between RO membrane temperature, permeate flow rate and permeate conductivity. Thus, the estimated or measured permeate flow rate is then compared with the predetermined energy efficient permeate flow rate, and if they are not equal, or within a predetermined margin of, the rate of the feed pump is changed. In some embodiments, the controlling S5 comprises controlling the feed pump 23 by means of a feedback-controller, where the input to the feedback-controller is the estimated permeate flow rate, and the control variable is the feed pump rate. The feedback-controller is for example a P-, PI- or PID-controller, where P stands for proportional, I for integral and D for derivative. The controller is implemented as a control loop algorithm. Typically, the feed pump rate is adjusted to minimize an error between the estimated permeate flow rate and the desired predetermined energy efficient permeate flow rate.

The permeate flow rate is for example measured using the first flow sensor device 27 (FIGS. 2 and 3) to measure the permeate flow rate. Alternatively, the permeate flow rate is estimated by measuring the feed flow rate and the reject flow rate, and subtracting the reject flow rate from the feed flow rate.

In some embodiments, the predetermined relation between RO membrane temperature, permeate flow rate and permeate conductivity, is included in a predetermined scheme or table where membrane temperature, permeate flow rate and permeate conductivity are paired, or related. Thus, the scheme or table gives a value that the permeate flow rate should have, to give a certain permeate conductivity at a certain temperature. Thus, an energy efficient permeate flow rate can be determined for each estimated membrane temperature for a certain desired permeate conductivity, by matching the estimated membrane temperature with the membrane temperature values in the table for the certain desired permeate conductivity. The matching membrane temperature value for the certain desired permeate conductivity will then give the energy efficient permeate flow rate.

In some embodiments, the energy efficient permeate flow rate is equal to a minimum permeate flow rate needed to achieve the desired permeate conductivity. The controlling S5 the rate of the feed pump 23 then comprises controlling the rate of the feed pump 23 to achieve an energy efficient permeate flow rate being a minimum permeate flow rate needed to achieve the desired permeate conductivity. The higher RPM of the feed pump 23, the more energy is consumed. In other words, for each membrane temperature, there is an optimal working-point for the RO device 26, where it produces permeate water with a desired conductivity, with as little consumed energy by the feed pump 23 as possible. The consumed power (thus measured in Watt) by the feed pump 23 is correlated with the permeate flow rate. Thus, the optimal working-point for each membrane temperature is determined as the lowest permeate flow rate that generates the desired permeate conductivity. These results may be translated into a function determining what the permeate flow rate should be at different temperatures.

Figure 5:
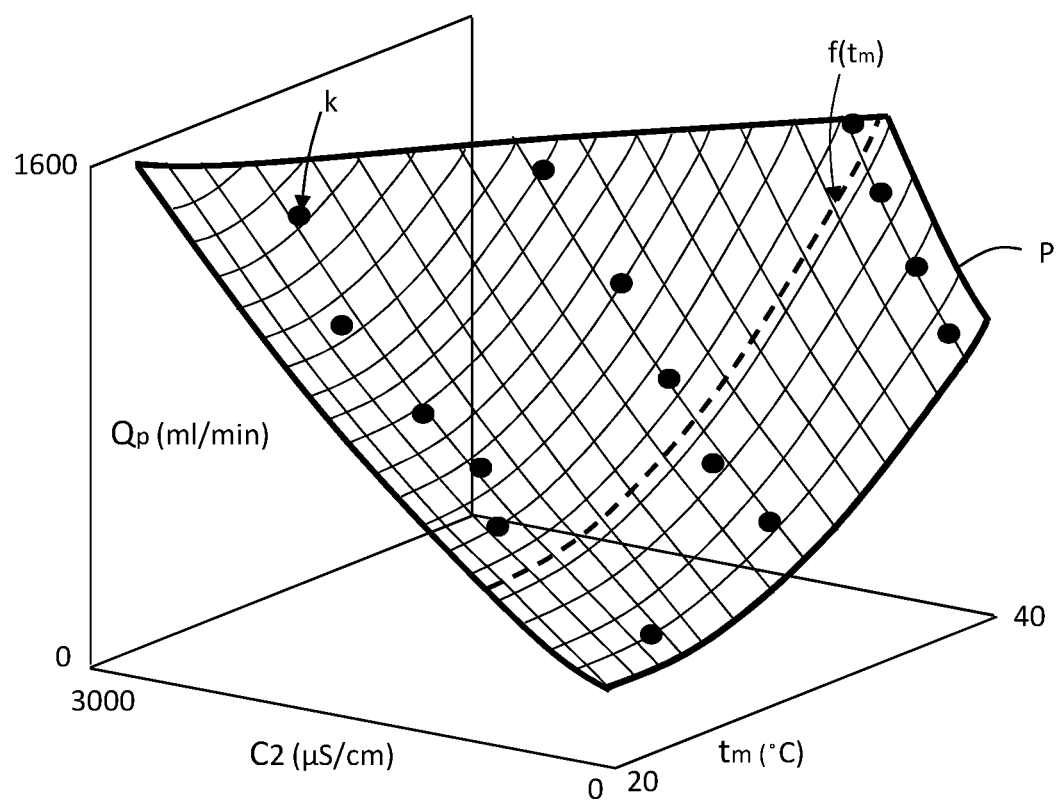
FIG. 5 illustrates an exemplary three-dimensional graph showing where it was possible to generate a conductivity of the permeate of approximately 30 µS/cm, as a function of temperature, feed conductivity and permeate flow.

FIG. 5 illustrates an exemplary three-dimensional graph showing a plane P where it is possible to generate a desired conductivity of the permeate, as a function of membrane temperature $t_m$ (°C.), feed conductivity C2 (μS/cm) and permeate flow rate $Q_p$ (ml/min). The data for the graph has been obtained by experiments using a recirculation pump as the recirculation mechanism. The desired permeate conductivity is here approximately 30 μS/cm, but could be other desired set-point. The points k in the graph represents points where approximately the desired permeate conductivity could be achieved, for varying membrane temperatures, feed conductivities and permeate flow rates. These points were used as a basis for a second order interpolation to obtain the plane P, and have been experimentally obtained. The plane P is thus an estimation of what permeate flow rate is needed at a given membrane temperature and feed conductivity to create a desired permeate quality, here a permeate conductivity of 30 μS/cm, for a certain RO membrane. In some embodiments, the aforementioned schedule or table includes discrete points of the plane P. The plane P may alternatively be represented as a function $f(t_m, C1)=Q_p$. Energy consumption and water efficiency are coupled in a manner such that it is impossible to minimize both at the same time. For example, an increased feed pressure results in a higher salt rejection by the membrane 26a and thus more water can be recirculated instead of being rejected through the drain valve 46. This means that saving water will cost more energy. On the other hand, if energy consumption was to be minimized, salt rejection would decrease and then more water must be rejected. As a result, increased water efficiency will increase energy consumption and vice versa. However, by selecting a curve on the aforementioned plane it is possible to find an algorithm that minimizes energy consumption without wasting more water than necessary to achieve the desired permeate conductivity. Thus, a curve represented by function $f(t_m)=Q_p$ may be selected, as illustrated by the hatched line in the diagram. The function allows the apparatus to work with an inlet fluid with high conductivity, and when the temperature decreases, the apparatus saves energy by reducing the permeate flow. In some embodiments, the curve represents the predetermined relation between RO membrane temperature, permeate flow rate and permeate conductivity. The curve may be represented by discrete points, and in some embodiments, the discrete points are included in the predetermined scheme or table as membrane temperature, permeate flow rate and permeate conductivity. Thus, the scheme or table gives a value that the permeate flow rate should have, to give a certain permeate conductivity at a certain temperature. By matching the estimated temperature with the membrane temperature values or ranges in the scheme or table, at a certain desired permeate conductivity, the thereto related needed permeate flow rate to obtain the desired permeate conductivity can be obtained. The feed pump can then be controlled to achieve the needed permeate flow rate, e.g. by measuring the actual permeate flow rate and compare it with the needed permeate flow rate. If they are not equal (optionally within a predetermined margin, e.g. ±5% of the desired permeate conductivity, or within an interval of the desired permeate conductivity, e.g. ±5% of the desired permeate conductivity), the feed pump rate is changed until they are equal (optionally until the feed pump rate is within the predetermined margin or interval).

From the diagram in FIG. 5, it is known that when the apparatus 1 is running at 40° C. the maximum allowed conductivity that generates a permeate conductivity of 30 μS/cm is limited to 1292 μS/cm. In one example embodiment, a function is selected that allows the apparatus 1 to function at a maximum allowed conductivity at 40° C., but when the membrane temperature decrease, the apparatus 1 would save energy by reducing the permeate flow. For instance, if the membrane temperature was 40° C., the function would set an energy efficient permeate flow rate to 1440 ml/min. If the temperature was reduced to 30° C. the function would set the energy efficient permeate flow rate to 767 ml/min and thereby saving energy. If the temperature was further reduced to 20° C. the algorithm would set the energy efficient permeate flow rate to 506 ml/min. In one example embodiment, the function is then: $Q_p=2.2254 \cdot t^2 - 85.209 \cdot t + 1320.6$, where t is the membrane temperature. The pumps (feed pump and recirculation pump) used during the experiments were magnet drive rotary vane pumps TSSS401 from Fluid-o-Tech. They were made for a maximum static pressure of 20 bar and have a speed limit of 1725 rpm and nominal flow rate of 400 l/h. The drain valve was a proportional valve, more specifically a motorized angle seat control valve. It has an integrated positioner and control the amount of flow going through the valve. The RO-membrane was a heat sanitizable RO membrane element from DOW FILMTECH, in more detail a polyamide thin-film composite type membrane with the product specification HSRO-4118 and part number 164869. These devices used in the experiment could however be exchanged with similar devices.

Generally, when the temperature of the RO-membrane increases, the rate of the feed pump 23 should increase to increase the permeate flow and thereby dilute the permeate water such that the permeate conductivity is not compromised by the increased amounts of ions etc. that pass the RO-membrane when it becomes warmer. Thus, in some embodiments, the controlling S5 the rate of the feed pump 23 comprises controlling the rate of the feed pump 23 to increase the flow rate of the permeate water upon the temperature of the RO membrane 26a increases. When the temperature of the RO-membrane decreases, the rate of the feed pump 23 should decrease to decrease the permeate flow and thereby not operate the feed pump 23 harder than necessary to obtain the predetermined permeate conductivity, as less amounts of ions pass the RO-membrane when it becomes colder. Thus, in some embodiments, the controlling S5 the rate of the feed pump 23 comprises controlling the rate of the feed pump 23 to decrease the flow rate of the permeate water upon the temperature of the RO membrane 26a decreases. The increase or decrease of the temperature of the RO membrane 26a is typically determined by comparing a present estimated or measured temperature of the RO membrane 26a, with a previous estimated or measured temperature of the RO membrane 26a. If there is a difference, thus an increase or decrease of the temperature of the RO membrane 26a, the rate of the feed pump 23 is controlled accordingly.

Passing to Drain

The salts etc. rejected by the RO-membrane are concentrated in the reject water. In some embodiments, the method comprises passing a portion of the reject water to drain 46, in order to remove some of the concentrated particles. The rest of the reject water is recirculated to the feed water as previously explained. Thereby the concentration, thus the conductivity, of the feed water can be kept below a predetermined threshold, and optionally fairly constant.

As previously described, it is desired to maintain the apparatus at a working-point that is considered optimal for the RO-membrane. This working-point is for example set presuming a certain constant feed conductivity. As the recirculated water accumulates salts etc. rejected from the RO-membrane, and thereby also increases the amounts of salts in the feed water, the feed water conductivity will also increase. It might then not be possible to keep the RO-membrane at the chosen working-point, and the permeate conductivity will thereby increase. However, by passing some of the reject water to drain instead of being recirculated, the concentration of the recirculated water will decrease. As follows, the feed water conductivity is reduced, and the apparatus 1 can be kept at its working-point. Thus, in some embodiments, the method comprises measuring S6 conductivity of the permeate water. Thereby the permeate conductivity can be evaluated. For example, the conductivity cell 28 is used to measure the permeate conductivity. The method further comprises controlling S7 a drain valve 32 to pass a portion of the reject water to a drain 46 to make the conductivity of the permeate water equal to, or within a predetermined margin of, the desired permeate conductivity. For example, the method comprises controlling the drain valve 32 to open to pass reject water to drain, such that the permeate conductivity becomes the desired permeate conductivity. The permeate conductivity is for example measured with a permeate conductivity cell 28. In some embodiments, the controlling the drain valve 32 comprises using a feedback-controller, where the input to the feedback-controller is the conductivity of the permeate water, and the control variable is the opening of the drain valve 32, e.g. the degree of opening of the drain valve. The drain valve 32 typically has two states, fully opened or closed. In some embodiments, the drain valve 32 is configurable to a plurality of open states, in which states the volume flow rate is gradually increased from up to fully open, where a maximal volume flow rate is allowed. The feedback-controller is for example a P-, PI- or PID-controller. The controller is implemented as a control loop algorithm. Typically, the opening of the drain valve 32 is adjusted to minimize an error between the conductivity of the permeate water and the desired permeate conductivity. Alternatively, the drain valve 32 is set to open with a pre-determined constant interval, that has been determined to match the apparatus such that the desired permeate conductivity is achieved.

Net driving pressure depends on the feed pressure in the recirculation line 44, permeate side pressure and also the osmotic pressure caused by the different salt concentrations across the membrane 26a. In order to save energy, it is beneficial to have a low permeate side pressure and low conductivity in the recirculation line 44. In order to save water, the controlling of the drain valve 32 accumulates high conductivity water in the recirculation line 44 which increases NDP. However, this drawback is necessary to maintain a high water efficiency and the slight decrease in NDP may be worth the increase in water efficiency. It is possible to increase the feed side pressure by increasing the recirculation pump speed, although, this requires more energy. One way to improve the NDP of the apparatus 1 without decreasing water efficiency or increasing energy consumption is to decrease the permeate side pressure. This may be done by selecting components on the permeate side (downstream the RO unit) with a low pressure drop and by using a short permeate line 42.

During controlling the apparatus, the permeate flow rate will vary and thereby the amount of permeate produced. In some cases, it is desired to produce permeate water with a certain flow rate. In order to do so, some of the permeate water is recirculated to a point upstream the feed pump 23. Thereby an excess amount of permeate water can be reused, instead of e.g. being passed to drain. For that purpose, a permeate recirculation line 47, illustrated in the second embodiment in FIG. 3, may be used. In order to control the permeate flow rate, the permeate flow rate is measured or estimated. Thus, in some embodiments, the method comprises measuring S8 a permeate flow rate downstream a recirculation point 48. The permeate flow rate is for example measured in the permeate fluid line 42. The method further comprises controlling S9 recirculation of permeate water from the recirculation point 48 to the inlet water at a point upstream the feed pump 23, to obtain a predetermined permeate flow rate downstream the recirculation point 48. The controlling is for example performed with the permeate recirculation valve 34 (FIG. 3). In some embodiments, a post-treatment module 60 (FIG. 1) follows the apparatus 1, and the post-treatment module 60 produce product water. The method may then include measuring a flow rate of the product water, and controlling the recirculation of permeate water to obtain a predetermined product flow rate downstream the post-treatment module 60. By recirculating excessively produced permeate water, the inlet water will become more pure as it is diluted with the purified permeate water. Thereby the feed pump may use less energy, as it does not have to push so much water through the membrane to purify the water to the desired conductivity. Alternatively or in combination, the drain valve 32 may be configured (controlled or set) to pass a less amount of reject water to drain. More reject water will then be recirculated to the feed line 41, and water is saved.

The conductivity of the inlet water may vary during the year. A varying conductivity of the inlet water typically result in a varying feed water conductivity. By having a predetermined relation that is also depending on the feed water conductivity, optimal working-points for different feed water conductivities or different inlet water conductivities may be obtained. By modelling the recirculation water conductivity, the inlet water conductivity may be used to determine the feed conductivity by using the model. Thus, in some embodiments, the method comprises measuring S4 conductivity of the feed water. The controlling S5 of the feed pump rate then comprises controlling S5 the feed pump rate, based also on the measured conductivity of the feed water, to make the permeate flow rate equal to, or within a predetermined margin of, the energy efficient permeate flow rate determined based on a predetermined relation between RO membrane temperature, permeate flow rate, permeate conductivity and the feed water conductivity. For example, if returning to the diagram of FIG. 5, a curve function $f(t_m, C_1) = Q_p$ may be chosen where $C_1$ is selected to match the feed conductivity and/or inlet conductivity. The inlet conductivity may be measured with the inlet conductivity cell 21. For example, a curve is chosen where $C_1$ equals the feed conductivity or inlet conductivity. In some embodiments, the feed or inlet conductivity is measured at certain intervals, e.g. each month, and the optimal working-point is updated accordingly at the same time interval. In other embodiments, the feed or inlet conductivity is measured continually or continuously when the apparatus 1 is operating, and the optimal working-point is updated at the same interval, i.e. continually or continuously.

The disclosure also relates to a control arrangement 50 as previously described. The control arrangement 50 is configured to control recirculation a portion of reject water by means of the recirculation mechanism 33 to achieve a predetermined recovery ratio of permeate flow rate to feed flow rate. The control arrangement 50 is further configured to control the rate of the feed pump 23, based on the measured temperature indicative of the temperature of the RO membrane 26a and a desired permeate conductivity, to make the permeate flow rate equal to, or within a predetermined margin of, an energy efficient permeate flow rate, determined based on a predetermined relation between RO membrane temperature, permeate flow rate and permeate conductivity.

In some embodiments, the energy efficient permeate flow rate is equal to a minimum permeate flow rate needed to achieve the desired permeate conductivity. In such case, the control arrangement 50 is configured to control the rate of the feed pump 23 to achieve the energy efficient permeate flow rate being a minimum permeate flow rate needed to achieve the desired permeate conductivity.

In some embodiments, the control arrangement 50 is configured to control the feed pump 23 to increase the flow rate of the permeate water upon the temperature of the RO membrane 26a increases, and to decrease the flow rate of the permeate water upon the temperature of the RO membrane 26a decreases.

In some embodiments, the control arrangement 50 is configured to control the drain valve 32 to pass a portion of the reject water to the drain 46 to make the conductivity of the permeate water equal to, or within a predetermined margin of, the desired permeate conductivity.

In some embodiments, the control arrangement 50 is configured to control the drain valve 32 using a feedback-controller, where the input to the feedback-controller is the measured conductivity of the permeate water, and the control variable is the opening of a drain valve 32.

In the second embodiment of the apparatus 1, illustrated in FIG. 3, the apparatus 1 also comprises a permeate recirculation line 47 arranged between a recirculation point 48 in a permeate water line 42 and an inlet water line 40. The apparatus 1 further comprises a control device 34 arranged to control a flow rate of the recirculated permeate water in the permeate recirculation line, and a second flow rate sensor device 35 arranged to measure a permeate flow rate downstream the recirculation point 48. In this embodiment, the control arrangement 50 is configured to control recirculation of permeate water in the permeate recirculation line 47, by means of the control device 34, to obtain a predetermined permeate flow rate downstream the recirculation point 48.

In some embodiments, the control arrangement 50 is configured to control the rate of the feed pump 23 based on also the measured conductivity of the feed water, to make the permeate flow rate equal to, or within a predetermined margin of, an energy efficient permeate flow rate determined based on a predetermined relation between RO membrane temperature, permeate flow rate, permeate conductivity and the feed water conductivity.

In some embodiments, the control arrangement 50 is configured to control the feed pump 12 by means of a feedback-controller, where the input to the feedback-controller is the permeate flow rate, and the control variable is the feed pump rate.

In some embodiments, the control arrangement 50 is configured to provide an estimate of a feed flow rate $Q_f$ of the feed water, and calculate a recovery ratio as $$Y = \frac{Q_p}{Q_f}.$$

The permeate flow rate $Q_p$ of the permeate water is for example obtained from the first flow rate sensor device 27.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A method for controlling a water purification apparatus, the water purification apparatus comprising a reverse osmosis device including a reverse osmosis membrane, and a feed pump configured to receive inlet water and direct feed water to an inlet of the reverse osmosis device, the reverse osmosis device configured to thereby create permeate water and reject water; wherein the method comprises:
   recirculating, by means of a recirculation mechanism, a portion of the reject water to the feed water to achieve a predetermined recovery ratio of a permeate flow rate of the permeate water to a feed flow rate of the feed water;
   measuring a temperature indicative of a reverse osmosis membrane temperature;
   measuring a flow rate indicative of the permeate flow rate of the permeate water;
   measuring a feed water conductivity indicative of a conductivity of the feed water;
   measuring a permeate conductivity of the permeate water;
   controlling a feed pump rate, based on the measured temperature indicative of the reverse osmosis membrane temperature and a desired permeate conductivity, such that the permeate flow rate is at or within a predetermined margin of an energy efficient permeate flow rate, the energy efficient permeate flow rate determined based on a predetermined relation between the reverse osmosis membrane temperature, the permeate flow rate, the permeate conductivity of the permeate water and the feed water conductivity; and
   controlling a drain valve to pass a portion of the reject water to a drain such that the conductivity of the permeate water is at or within a predetermined margin of the desired permeate conductivity.

2. The method according to claim 1, wherein the energy efficient permeate flow rate is equal to a minimum permeate flow rate needed to achieve the desired permeate conductivity.

3. The method according to claim 1, wherein the controlling the feed pump rate comprises:
   controlling the feed pump rate to increase the permeate flow rate upon the temperature of the reverse osmosis membrane increasing, and
   controlling the feed pump rate to decrease the permeate flow rate upon the temperature of the reverse osmosis membrane decreasing.

4. The method according to claim 1, wherein controlling the drain valve comprises using a feedback-controller, wherein an input to the feedback-controller is the permeate conductivity of the permeate water, and a control variable controlled by the feedback-controller is an opening of the drain valve.

5. The method according to claim 1, comprising:
   measuring the permeate flow rate of a permeate line downstream a recirculation point;
   controlling recirculation of permeate water from the recirculation point to the inlet water at a point upstream the feed pump to obtain a predetermined permeate flow rate of the permeate line downstream the recirculation point.

6. The method according to claim 1, wherein controlling the feed pump comprises controlling the feed pump by means of a feedback-controller, wherein an input to the feedback-controller is the permeate flow rate, and a control variable controlled by the feedback-controller is the feed pump rate.

7. The method according to claim 1, wherein the recirculating of a portion of the reject water comprises:
   providing an estimate of a feed flow rate $Q_f$ of the feed water, and
   calculating the predetermined recovery ratio as $$Y = \frac{Q_p}{Q_f},$$

wherein Y is the predetermined recovery ratio and $Q_p$ is the permeate flow rate.

8. A water purification apparatus comprising:
   a reverse osmosis device comprising a reverse osmosis membrane;
   a feed pump arranged to receive inlet water and to direct feed water to an inlet of the reverse osmosis device, wherein the reverse osmosis device is configured and arranged to create permeate water and reject water from the feed water;
   a recirculation mechanism arranged to recirculate a portion of the reject water to the feed water;
   a temperature sensor device arranged to measure a temperature indicative of a temperature of the reverse osmosis membrane;
   a first flow rate sensor device arranged to measure a flow rate indicative of a permeate flow rate of the permeate water;

a first conductivity cell arranged to measure a feed water conductivity indicative of a conductivity of the feed water;

a second conductivity cell arranged to measure a permeate conductivity of the permeate water;

a drain valve arranged to pass a portion of the reject water to a drain; and a control arrangement configured to:

control recirculation of the portion of the reject water by means of the recirculation mechanism to achieve a predetermined recovery ratio of permeate flow rate to feed flow rate, control a feed pump rate, based on the measured temperature indicative of the temperature of the reverse osmosis membrane and a desired permeate conductivity, such that the permeate flow rate is at or within a predetermined margin of an energy efficient permeate flow rate, the energy efficient permeate flow rate determined based on a predetermined relation between the reverse osmosis membrane temperature, the permeate flow rate, the permeate conductivity of the permeate water and the feed water conductivity, and control the drain valve to pass a portion of the reject water to the drain to make the conductivity of the permeate water at or within a predetermined margin of the desired permeate conductivity.

9. The apparatus according to claim 8, wherein the energy efficient permeate flow rate is equal to a minimum permeate flow rate needed to achieve the desired permeate conductivity.

10. The apparatus according to claim 8, wherein the control arrangement is configured to control the feed pump to:

increase the flow rate of the permeate water upon the temperature of the reverse osmosis membrane increasing, and decrease the flow rate of the permeate water upon the temperature of the reverse osmosis membrane decreasing.

11. The apparatus according to claim 8, wherein the control arrangement is configured to control the drain valve using a feedback-controller, where an input to the feedback-controller is the measured conductivity of the permeate water, and a control variable controlled by the feedback-controller is the opening of the drain valve.

12. The apparatus according to claim 8, further comprising:

a permeate recirculation line arranged between a recirculation point in a permeate water line and an inlet water line;

a control device arranged to control a flow rate of the recirculated permeate water in the permeate recirculation line; and a second flow rate sensor device arranged to measure the permeate flow rate of the permeate line downstream the recirculation point, wherein the control arrangement is configured to control recirculation of permeate water in the permeate recirculation line, by means of the control device, to obtain a predetermined permeate flow rate of the permeate line downstream the recirculation point.

13. The apparatus according to claim 8, wherein the control arrangement is configured to control the feed pump by means of a feedback-controller, wherein an input to the feedback-controller is the permeate flow rate, and a control variable controlled by the feedback-controller is the feed pump rate.

14. The apparatus according to claim 8, wherein the recirculation mechanism is a recirculation pump.

15. The apparatus according to claim 8, wherein the control arrangement is configured to provide an estimate of a feed flow rate $Q_f$ of the feed water, and calculate the predetermined recovery ratio as $$Y = \frac{Q_p}{Q_f},$$

wherein Y is the predetermined recovery ratio and $Q_p$ is the permeate flow rate.

16. A water purification apparatus comprising:

a reverse osmosis device comprising a reverse osmosis membrane;

a feed pump arranged to receive inlet water and to direct feed water to an inlet of the reverse osmosis device, wherein the reverse osmosis device is configured and arranged to create permeate water and reject water from the feed water;

a recirculation mechanism arranged to recirculate a portion of the reject water to the feed water;

a temperature sensor device arranged to measure a temperature indicative of a temperature of the reverse osmosis membrane;

a first flow rate sensor device arranged to measure a flow rate indicative of a permeate flow rate of the permeate water;

a first conductivity cell arranged to measure a feed water conductivity indicative of a conductivity of the feed water; and a control arrangement configured to:

control recirculation of the portion of the reject water by means of the recirculation mechanism to achieve a predetermined recovery ratio of permeate flow rate to feed flow rate, control a feed pump rate based on the measured temperature indicative of the temperature of the reverse osmosis membrane and a desired permeate conductivity, such that the permeate flow rate is at or within a predetermined margin of an energy efficient permeate flow rate, the energy efficient permeate flow rate determined based on a predetermined relation between the reverse osmosis membrane temperature, the permeate flow rate, a permeate conductivity of the permeate water and the feed water conductivity, and provide an estimate of a feed flow rate $Q_f$ of the feed water, and calculate the predetermined recovery ratio as $$Y = \frac{Q_p}{Q_f},$$

wherein Y is the predetermined recovery ratio and $Q_p$ is the permeate flow rate.

* * * * *